Feb. 14, 1956

C. VOLFF ET AL 2,735,036

ARC WELDING APPARATUS

Filed July 13, 1951

Inventors
Charles Volff &
Julius Hammerslag
By Alda Jacobery
Attorney

Feb. 14, 1956    C. VOLFF ET AL    2,735,036
ARC WELDING APPARATUS

Filed July 13, 1951    2 Sheets-Sheet 2

Inventors
Charles Volff &
Julius Hammerslay
By
Attorney

United States Patent Office 2,735,036
Patented Feb. 14, 1956

2,735,036
ARC WELDING APPARATUS

Charles Volff and Julius Hammerslag, Montreal, Quebec, Canada, assignors to L'Air Liquide, Societe Anonyme pour l'Etude et l'Exploitation des Procedes Georges Claude, Paris, France Application July 13, 1951, Serial No. 236,516

5 Claims. (Cl. 315—129)

This invention relates to improvements in procedure and in apparatus for arc welding.

This application is a continuation-in-part of application Serial No. 89,458, filed April 25, 1949, now Patent No. 2,574,514.

More specifically, the invention relates to arc welding apparatus and procedure in which there is employed a welding torch or electrode-holder, means for furnishing normal alternating welding current to the torch and means for furnishing a high-frequency current for striking or sustaining the arc or both.

It is known that when using an alternating or a direct current to weld metal, it is sometimes necessary to stabilize the arc by the use of high-frequency alternating current superimposed on ordinary alternating current. This is often the case when arc welding metal with a shield of an inert gas.

Generally this high-frequency current is produced by an air gap oscillator. One of the drawbacks to this type of oscillator is that the high-frequency oscillations interfere with neighboring radio receiving stations so that this type of apparatus has been generally condemned by authorities. Accordingly, the authorities have assigned certain permissible narrow wave bands within which such high-frequency arc-sustaining current may be employed. One such band is between 13.55322 and 13.56678 megacycles.

The generation and use of this very high frequency presents problems heretofore foreign to the welding art. The problems here are to fix the frequency within the narrow limits prescribed, to utilize a power input sufficiently low to render the apparatus economic but at the same time sufficiently high to be of value in striking or sustaining the arc.

Normally, one skilled in the welding art would not expect to be able to achieve these functions with an electronic high-frequency continuous wave generating apparatus.

Some attempts have been made to use electronic apparatus to generate and superimpose pulses of high frequency on the welding current. But impractically complicated means are necessary to synchronize these pulses with the phase of the welding current and even then radio broadcasting interference generally results.

Having regard to the foregoing, the applicants have developed an apparatus in which the electronic means is capable of producing continuous alternating current at a frequency within a given very high-frequency band and of supplying this high frequency to the electrode holder to strike or sustain the arc without emitting broadcast interfering radiations.

The electronic means includes a generator having a vacuum tube oscillator. The high frequency current is suitably fed from the generator to the welding electrode, preferably through a transformer. The electronic means is calibrated to produce its high frequency current in a band of frequency permissible for industrial apparatus. In accordance with the invention means is also provided for tuning the entire electronic circuit including the vacuum tube oscillator, the welding circuit and the generator of the welding circuit. The apparatus by this construction provides at least for striking the arc, in the case where direct current is used for welding, or for both striking and sustaining the arc where alternating current is used for welding, a maximum power output at the end of the welding circuit adjacent to the electrode holder and a minimum of radiation at the welding circuit.

Preferably the vacuum tube oscillator is stabilized by a crystal and amplified by at least one amplification circuit. Preferably the electronic means is calibrated to produce high frequency current at a frequency considerably higher than broadcast frequency.

Further in accordance with the invention, means is provided adjacent to the electrode holder for indicating the power given to the electrode holder by the H. F. unit and means is included for adjusting the power from the H. F. unit to the electrode holder. The indicating means, which may also be used when the electrode holder is energized with a high frequency current by other means than above disclosed, is a luminous electric discharge apparatus, for instance a cathode glow lamp. The adjacency of the indicating means to the electrode holder results in said means indicating the high frequency voltage prevailing at a place close to where use is made of the high frequency power, which is very important since the voltage of a high frequency power varies from one point to the other of the electric circuit of this power.

Having thus generally described the invention, reference will now be made to the accompanying drawings illustrating preferred apparatus in which it is embodied, and in which.

Figure 1:
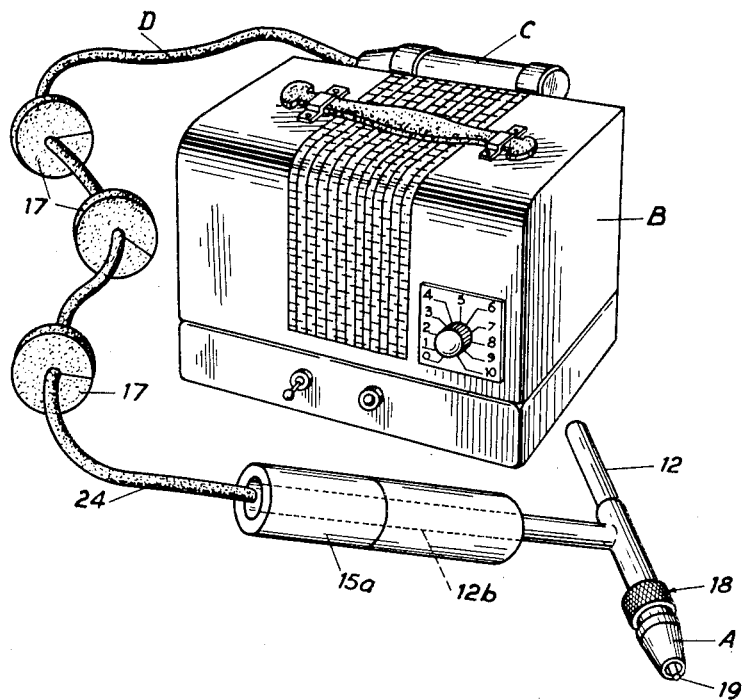
Figure 1 is a schematic diagram showing the general arrangement of an embodiment of the invention.

Referring more particularly to the drawings, the details of the apparatus represented on Figures 1 and 2, which is used for inert gas arc welding, are as follows: A is the welding torch, B the electronic unit for supplying arc-sustaining A. C. and also including a lead-in unit C for the gases used in the welding operation and cooling water. The unit B is a generator equipped with radio tubes and emitting a continuous high frequency A. C. in the band between 13.55322 and 13.56678 megacycles. D is a cable leading from the units B and C to the torch. The torch is provided with a welding tip 19, an indicating head 12, and handle 12b. Around the handle 12b is an additional insulating cover 15a preferably of a plastic material like "Lucite" capable of shielding the unit from loss of H. F. The cable may be provided with a number of rings, preferably split rings, of rubber or other insulating material 17 which are adapted to prevent contact of the cable with the ground or grounded objects. This serves the same purpose as a coaxial cable which would be impractical on the scale required for carrying welding current.

Figure 2:
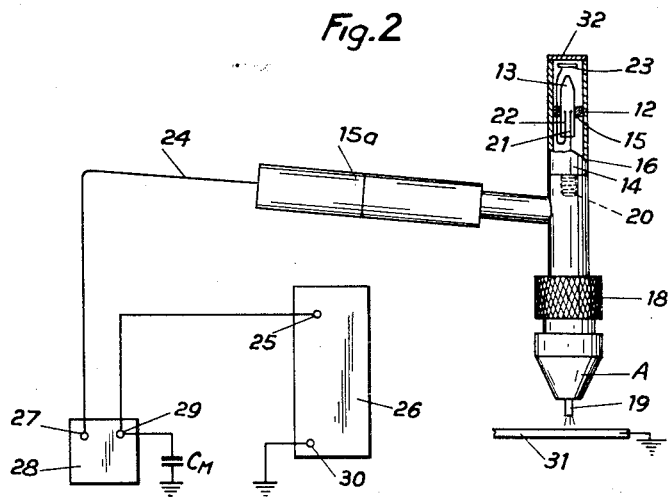
Figure 2 is a diagrammatic view showing details of the torch and current indicating means of the embodiment shown on Figure 1.

As more clearly indicated in Figure 2, the torch includes an electrode holder 18 of the type commonly used for inert gas welding. The electric cable 24 or D which enters the handle is connected, one end to the electrode 19 and the other to the terminal 27 of the source 28 of the high frequency current. The terminal 29 is connected to the terminal 25 of the source 26 of the low-frequency current. The terminal 29 is also connected to a condenser. The condenser, the second terminal 30 of the source of A. C. current 26 and the work-piece 31 are grounded. The terminals 29 and 30 may also be connected to the work-piece by a lead. In the preferred electrode holder 18 illustrated, is a part connected to the electrode 19 in which there is a tapped hole 20 and a luminous discharge apparatus 13 is screwed into this hole. The main purpose of this discharge apparatus is to permit the high-frequency unit to be tuned or adjusted for maximum or desired signal strength at the torch, i. e. the electrode holder. This tapped hole also serves to conduct the current to the electrode 21 of the discharge apparatus which is connected to the welding electrode 19. The discharge apparatus in the preferred form of the device is a glow tube having its stabilization resistance in the base. This tube is mounted in a shield 12 having a base 14, a transparent casing 16 and a ring 15, and an insulating cover 32 having a metal plate 23 attached on the inside. The base 14 is metallic and screws in the threaded hole 20. The base is connected to the electrode 21 which thus has the voltage of the welding electrode 19. The metal plate 23 is connected to the other electrode 22 of the tube 13 and allows for the capacitative connection of this electrode to the ground through the cover 32 which also protects it mechanically while allowing observation of the light which it gives.

This casing holds the lamp 13 in place with the aid of the ring 15 which is preferably transparent.

For carrying out the adjustment of the source of high frequency the operator has only to place the cover 32 in the neighborhood of the piece to be welded, for example, and to seek the position of the adjustment regulating parts of the source of high frequency which gives from the tube 13 the amount of light corresponding to the welding conditions desired. Once this adjustment is made, the operator moves the cover 32 away from the work-piece thereby stopping the lamp from tapping the current and leaving all the high-frequency current for the welding. The operator can also place his hand on the cover when the electrode holder is in the vicinity of the place where he is working and have the adjustments made at the source.

The lamp 13 can be moved by base 14 from its shield.

Figure 3:
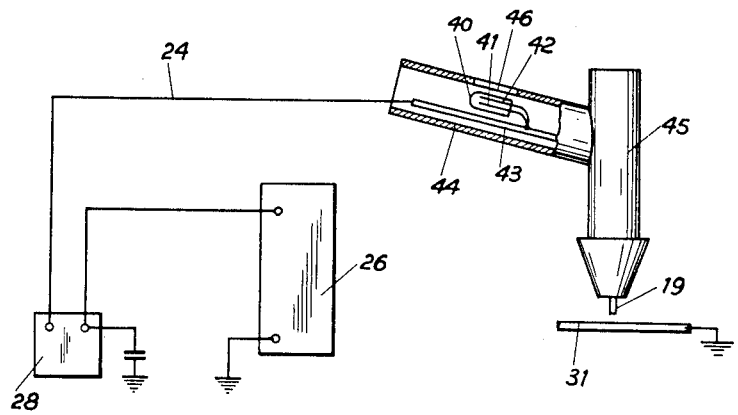
Figure 3 is a diagrammatic view of another embodiment of the invention.

Figure 3 is a diagrammatic view of a welding apparatus similar to that shown on Figures 1 and 2, except as regards the indicating means. In this apparatus, the indicating glow lamp 40 is situated inside the sleeve 44 which forms the external part of the handle of the electrode holder 45; this sleeve is made of an insulating material and is provided with an opening 46 allowing to see the lamp 40. Moreover, both electrodes 41, 42, of lamp 40 are connected to the wire 43 which connects the cable 24 to the welding electrode.

When the operator places his hand around the handle 44, the high frequency current capacitively flows from wire 43 to the ground through both electrodes 41 and 42, the gaseous atmosphere of lamp 40, the sleeve 44 and the air between lamp 40 and the hand of the operator, and said operator; the gas of lamp 40 thus glows, more or less according to the high frequency voltage of wire 43; the lamp is watched through opening 46. During the welding operation, the operator's hand remains gripping the sleeve 44 but the current intensity in lamp 40 is low, due to the fact that the lamp is then substantially short-circuited by the ionized space between electrode 19 and work-piece 31.

Figure 4:
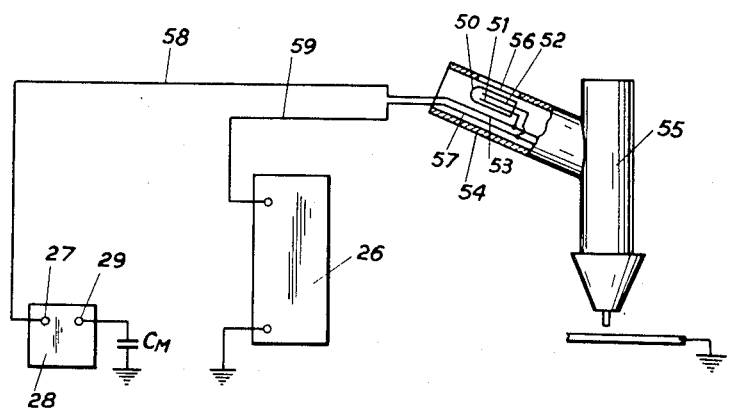
Figure 4 is a diagrammatic view of still another embodiment of the invention.

Figure 4 diagrammatically shows another welding apparatus where use is made of the same sources of current 26, 28 as in the former embodiments. In the present case, however, these sources are connected to the electrode holder 55 through separate cables 58, 59 and wires 53, 57. The indicating glow lamp 50 is again placed inside the insulating sleeve 54 of the electrode holder handle, behind an opening 56 thereof. In the present case, one electrode, 51, of lamp 50, is connected to one of the lead wires, 53, and the other electrode, 52, to the other wire, 57, the usual ballasting resistance of the glow lamp being inserted in any of the above connections.

The circuit of the high frequency current from electrode 52 to that terminal 29 of the source 28 which is not connected to the glow lamp is as follows: the wire 57, the cable 59, the source 26, ground, and the capacitor CM. As for the case of the apparatus of Figure 3, this circuit still exists during the welding operation and is then substantially short-circuited by the welding arc.

It is obvious that when the normal welding current and the high frequency power are led to the electrode holder by separate wires, the glow lamp may also have one or both electrodes connected to the wire for the high frequency current, and none to the wire for the normal welding current, the connection to the grounded terminal of the high frequency current generator being effected through the operator or through a grounded piece, as in the embodiments shown on Figures 1 and 2, or 3.

The same indicating means as above may also be used when the electrode is not a relatively short electrode, as represented, but is a longer electrode, or even an electrode wire, coated or not.

What we claim is:

1. Arc welding apparatus comprising, in combination, a torch, a source of welding current, a source of high frequency current permanently tuned within a narrow frequency band upwards of about 10 mHz., electrical connections from said torch to both said sources and from both said sources to the ground, a glow discharge tube, visibly carried by said torch, having two main electrodes, at least one of which is permanently connected to a part of the torch connected to the high frequency source, and means for causing a high frequency current to pass from the torch to the ground through said tube while substantially preventing the passage of low-frequency currents through said tube thereby causing illumination of said tube by high-frequency current only, the specific voltage drop of said tube being within the appropriate range for obtaining clearly visible variations of the tube illumination when the desired open-circuit high frequency voltage appears between the torch and the ground, and for said tube to divert a negligible fraction only of the high frequency current which becomes established across the arc gap after the arc is struck.

2. Arc welding apparatus according to claim 1, in which one main electrode of the glow tube is connected to the torch and the second one to an insulated metallic member carried by said torch and adapted to form, when brought in the vicinity of a grounded body, a capacitive link therewith for passing through said glow tube a high-frequency current sufficient to cause said tube to become illuminated, said metallic member being sufficiently small and sufficiently insulated to render said capacitive link practically non-transmissive for low-frequency currents.

3. Arc welding apparatus according to claim 1, in which both main electrodes of the glow tube are connected to the torch and the means for causing illumination of said tube is the high-frequency field between said electrodes and a grounded body.

4. Arc welding apparatus according to claim 1, in which the connections from the torch to the welding current source and to the high-frequency current source are separate, and the main electrodes of the glow tube are respectively connected to said connections.

5. As an article of manufacture, a torch for arc welding with the assistance of a remote source of high-frequency current being permanently tuned within a narrow frequency band higher than about 10 mHz., said torch being provided with a glow discharge tube having two main electrodes, at least one of which is permanently connected to a part of the torch connected to the high-frequency source, said tube being capable of showing a clearly visible variation of illumination when a desired open-circuit high frequency voltage appears at the torch.

References Cited in the file of this patent

UNITED STATES PATENTS

| Number | Name | Date |
|---|---|---|
| 1,817,030 | Eberhard | Aug. 4, 1931 |
| 1,884,950 | Woodring | Oct. 25, 1932 |
| 2,017,897 | Emersleben | Oct. 22, 1935 |
| 2,228,367 | Sanders | Jan. 14, 1941 |
| 2,358,352 | Sherwood | Sept. 19, 1944 |
| 2,395,062 | Nielsen | Feb. 19, 1946 |
| 2,405,814 | Brannin | Aug. 13, 1948 |
| 2,479,964 | Pinkerton | Aug. 23, 1949 |
| 2,574,514 | Volff | Nov. 13, 1951 |